US008572252B2

(12) United States Patent
Ahuja et al.

(10) Patent No.: US 8,572,252 B2
(45) Date of Patent: Oct. 29, 2013

(54) EXTENSIBLE DYNAMIC PERFORMANCE INSTRUMENTATION OF PAGES

(75) Inventors: Vikas Ahuja, Sammamish, WA (US); Brian Charles Blomquist, Lynnwood, WA (US); Reeves Hoppe Briggs, Boxborough, MA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/757,640

(22) Filed: Apr. 9, 2010

(65) Prior Publication Data
US 2011/0252138 A1    Oct. 13, 2011

(51) Int. Cl.
*G06F 15/173*    (2006.01)
(52) U.S. Cl.
USPC ........................... 709/226; 709/233; 709/203
(58) Field of Classification Search
USPC ................................................. 709/226, 233
See application file for complete search history.

(56) References Cited

U.S. PATENT DOCUMENTS

| 5,781,449 | A | 7/1998 | Rosborough |
| 6,526,371 | B1 * | 2/2003 | Klein et al. ................... 702/186 |
| 7,461,369 | B2 | 12/2008 | Zhao |
| 7,600,014 | B2 | 10/2009 | Russell |
| 7,634,562 | B2 | 12/2009 | Litofsky |
| 7,647,323 | B2 | 1/2010 | Kasriel |
| 2002/0099818 | A1 * | 7/2002 | Russell et al. ................ 709/224 |
| 2002/0174421 | A1 * | 11/2002 | Zhao et al. .................... 717/174 |
| 2007/0118640 | A1 * | 5/2007 | Subramanian et al. ....... 709/224 |
| 2009/0106769 | A1 * | 4/2009 | Nakamura .................... 719/311 |
| 2009/0164629 | A1 * | 6/2009 | Klein et al. ................... 709/224 |

OTHER PUBLICATIONS

Author Unknown; Measure SharePoint Performance—Published Date: 2008 http://www.wssdemo.com/Shared%20Documents/MeasureSharePointPerformance.pdf (Copy Attached).
Savoia, Alberto; Web Page Response Time—Understanding and Measuring Performance Test Results—Published Date: Aug. 2001 http://ericgoldsmith.com/_oneclick_uploads/2009/02/web_page_response_time_101.pdf (Copy Attached).
Author Unknown; How to: Measure ASP.Net Responsiveness with the Web Application Stress Tool—Published Date: Mar. 27, 2007 http://support.microsoft.com/kb/815161 (Copy Attached).
Meier, J.D., et al.; Measuring .NET Application Performance—Published Date: May, 2004 http://msdn.microsoft.com/en-us/library/ms998579.aspx (Copy Attached).

(Continued)

*Primary Examiner* — Krista Zele
*Assistant Examiner* — James Forman
(74) *Attorney, Agent, or Firm* — Workman Nydegger

(57) ABSTRACT

Gathering performance information with respect to delivering web resources as perceived by a user at the web client. A method includes receiving a request for a web page. As a result of receiving the request, a first set of executable instructions are sent. The first set of executable instructions are configured to indicate a plurality of resources required to be at least one of downloaded to or rendered at the client for the web page to be considered loaded at the client. The first set of executable instructions are also configured to determine when each individual resource in the required resources have been be at least one of downloaded to or rendered at the client. The first set of executable instructions are also configured to determine a length of time associated with at least one of downloading to or rendering at the client the resources in the plurality of resources.

18 Claims, 3 Drawing Sheets

(56) References Cited

OTHER PUBLICATIONS

Author Unknown; SourceForge Pagetest—Published Date: Jan. 21, 2008 http://sourceforge.net/apps/mediawiki/pagetest/index.php?title=Main_Page (Copy Attached).

Author Unknown; YSlow User Guide—Retrieved Date: Feb. 4, 2010 http://developer.yahoo.com/yslow/help/index.html (Copy Attached).

Author Unknown; HttpWatch Features—Retrieved Date: Feb. 4, 2010 http://www.httpwatch.com/features.htm (Copy Attached).

* cited by examiner

EXTENSIBLE DYNAMIC PERFORMANCE INSTRUMENTATION OF PAGES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computers being interconnected has allowed for computers to provide services to other computers. For example, a web server can provide content to clients. In particular, an internet client such as Internet Explorer® available from Microsoft Corporation of Redmond Wash., can be used to access a web server. The web server can provide HTML code that defines how a web page should be displayed.

The HTML code may include text information for displaying text to a user at the internet client. The HTML code may also specify how the text should be displayed.

The HTML code may also define how images should be displayed in a web page, including such information as size and positioning of the images with respect to other content. The HTML code typically includes a reference to the location of the images themselves, such as a location on the web server or some other content repository.

The web server or other source may also provide executable script, such as Java script which may be executed at the internet client to enhance content display. Again, the HTML code will include a reference to the location to the script. Further, the web server or other source may deliver style sheets with additional general information about how a web page should be laid out and/or displayed.

Many modern web servers are designed to dynamically provide content. In particular, rather than simply storing HTML content pages, the web servers include a server application that generates HTML dynamically when a web page client requests content. The HTML content is typically created based on a server side script executed at the server. For example, a web page developer may create server side scripts that are then executed in a framework, such as an ASP.net® framework available from Microsoft Corporation of Redmond Wash., where the server side scripts are used to generate the HTML content. In this way, the web page returned can be customized for the client.

For example, it may be desirable to deliver different advertising content to an internet client located in Redmond, Wash. than to an internet client located in Salt Lake City, Utah. A web page developer can generate script source code that can be deployed and later executed at the web server that can include functionality for determining the location of an internet client (or any one of a number of other variables) and dynamically generate HTML content based on the determined location. This custom HTML content can then be sent to the internet client.

As noted, HTML pages will often reference a number of other resources. For example, an HTML page may reference several different graphical images that should be included when the web page is displayed or client side scripts that should be obtained and run in conjunction with rendering of the web page. There can be a significant amount of time to obtain external resources and to render the resources.

To automatically and conveniently measure load and render times of web pages in a browser, knowledge about when the individual components that make up the page have completely downloaded and rendered on the page is obtained. Examples of components of particular interest are client side script files, such as Java script files, and images.

Normally the developer would use an HTTP request viewer at a client to know when these components have been downloaded and manually compute the time taken between start and end of recording. However, this is only a simulated method of determining these times and is not particularly well suited to measuring page load times in the field when real users are using the web application from their individual computers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment including a web server and a web client. The method includes acts for gathering performance information with respect to delivering web resources as perceived by a user at the web client. The method includes a client, requesting a web page. The method further includes as a result of the request, receiving a first set of executable instructions. The first set of instructions are configured to indicate a plurality of resources required to be at least one of downloaded to or rendered at the client for the web page to be considered loaded at the client. The first set of instructions are further configured to determine when each individual resource in the required resources have been be at least one of downloaded to or rendered at the client. The first set of instructions are further configured to determine a length of time associated with at least one of downloading to or rendering at the client the resources in the plurality of resources. The method further includes receiving resources indicated in the plurality of resources. Using the executable instructions, the method includes determining that each individual resource in the required resources has been at least one of downloaded or rendered, and determining the length of time associated with at least one of downloading to or rendering at the client the resources in the plurality of resources.

Another embodiment illustrated herein may be practiced in computing environment including a web server and a web client. The method includes acts for gathering performance information with respect to delivering web resources as perceived by a user at the web client. The method includes receiving a request for a web page. As a result of receiving the request, the method includes sending a first set of executable instructions configured to indicate a plurality of resources required to be at least one of downloaded to or rendered at the client for the web page to be considered loaded at the client, and configured to determine when each individual resource in the required resources have been be at least one of downloaded to or rendered at the client, and to determine a length of time associated with at least one of downloading to or rendering at the client the resources in the plurality of resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may be implemented to eliminate the need for a developer to manually examine HTTP requests for the purpose of measuring page load times, while at the same time enabling measurement from any computer that accesses a web page. Instrumentation of web page code and content can be performed completely automatically and happens behind the scenes, but is also configurable by the developer so they can make any adjustments to the measurement procedures for more accurate data collection.

In particular, embodiments may be implemented where when a developer develops a web page, the developer can identify resources that must be downloaded and/or rendered at a client for the page to be considered loaded for purposes of calculating load time. Embodiments can then parse the developer code to create a listing of the identified resources for the web page. This listing can then be included in client side executable code that, when executed at a client, starts a browser provided timer, determines when all required resources have been downloaded and/or rendered, and uses the timer to provide an indication of a page load time, based on the amount of time to download and/or render the required resources. This indication can then be provided to a recording and reporting server used to track and report on page load times.

Determining when a resource has been downloaded or rendered can be accomplished in a number of different fashions. For example, browsers often include functionality indicating the state of an image file as either downloading or completed downloading. A state change from downloading to completed downloading can be used to determine that an image in the listing of required resources has been downloaded. For client side scripts, a server providing the client side scripts may be configured to append additional scripting, that when executed at the client, causes an indication to be made at the client that the client side script has been rendered.

Figure 1:
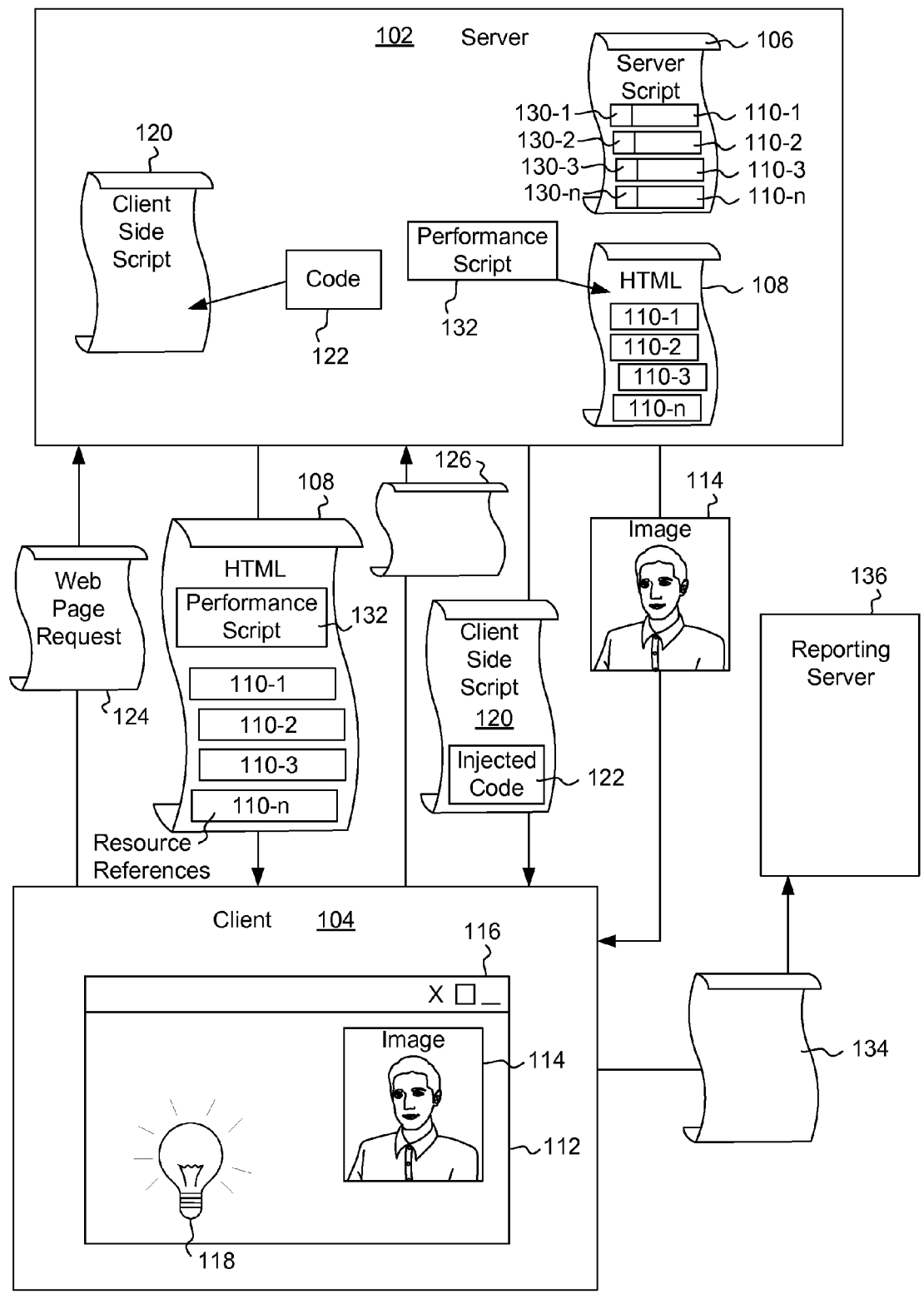
FIG. 1 illustrates an environment where gathering performance information regarding delivering web page resources can be implemented.

Referring now to FIG. 1, an example is illustrated. FIG. 1 illustrates a server 102 connected to a client 104. The server may include a framework, such as the ASP.net® framework available from Microsoft Corporation of Redmond Wash. The framework can be used to execute server side script such as the script 106 illustrated in FIG. 1. In particular, a developer can develop server executable script that can be executed in the context of a framework which can be used to dynamically create web page documents, such as the HTML document 108 illustrated in FIG. 1.

The HTML document 108 may define the layout of a web page and may include text information that can be displayed to a user according to the layout. Additionally, the HTML document 108 may include references referred to generally as 110, but shown specifically in FIG. 1 as examples 110-1, 110-2, and 110-3. The references may be URIs to resources. For example, the references 110 may be URIs pointing to images or client side code resources. Client side code resources may include scripts such as applets and the like which can be executed at the client to provide enhanced functionality at the client. The HTML document 108 may define how the resources pointed to in the references 110 are displayed or rendered in a web page.

FIG. 1 illustrates a client 104. The client can send web page requests 124 to the server 102 to request web pages. In response, the server 102 will return the HTML document 108, which instructs the client 104 what resources are needed for the web page and how to display the web page. The client 104 displays a web page 112. In the example illustrated, the web page displays an image 114. The image 114 may be retrieved from the server 102 or from some other resource repository by sending a resource request 126. The size of the image 114, the quality of the link between the server 102 and the client 104, network congestion, etc. will affect how quickly the image 114 can be delivered from the server 102 to the client 104. The web page 112 may be displayed using a browser 116, where the browser 116 includes a status indicator for images. In particular, the browser 116 may indicate that an image is in a loading state, or in a loaded state. Once the image 114 is downloaded, the full image 114 is typically displayed at the browser 116.

The web page 112 also illustrates a widget 118 displayed using client side script 120. The client side script 120 includes computer executable instructions that are executed at the client 102 and provide enhanced functionality for web page display. In the example illustrated, the client side script 120 is obtained from the server 102 by the client 102 sending a resource request 126, but may be obtained from other sources as well. Note that only a single resource request 126 is shown, however multiple and varied resource requests 126 may be sent to obtain images, scripts, style sheets, text, etc.

The HTML 108 delivered to the client 104 includes a reference, such as a URI, indicating to the client from where the client side script 120 should be obtained. To properly display the web page 112 in the browser 116, including the widget 118, the client side script needs to execute at the client 104. This may be referred to herein as rendering the client side script 120. To fully render the client side script 120, the client side script 120 is downloaded and executed at the client 104. The length of time to fully render the client side script 120 may be dependent on the size of the client side script 120, the quality of the connection between the server 102 and the client 104, network congestion between the server 102 and the client 104. Additionally, render time may be dependent on processing power available at the client 104 to execute the client side script 120. As discussed, embodiments may be configured to inject additional code 122 into the client side script 120. When the additional code 122 is executed, the additional code can provide a signal or an indication that the client side script 120 has been rendered.

As noted, it may be useful to track the amount of time it takes to load and/or render a web page. Some embodiments described herein provide this functionality by using timers at the client 102 along with providing a listing of resources that need to be downloaded and/or rendered and providing functionality for indicating that resources in the listing of resources have been downloaded and/or rendered.

FIG. 1 illustrates the server script 106 as described above. As illustrated in FIG. 1, the server script includes a list of resource references 110-1, 110-2, 110-3, through 110-n. These resource references may be defined by a web page developer and define the location where image, client side script, style sheet, and other resources can be obtained. The resource references (referred to generically as 110) may be included in the HTML document 108 delivered to the client 104.

FIG. 1 further illustrates indicators 130-1, 130-2, 130-3 through 130-n, included in the sever script 106. The indicators (referred to generically as 130) allow the developer to indicate which resources should be monitored for downloading and/or rendering. This allows a list to be provided to the client 104 so that the client 104 can perform appropriate monitoring to determine time required to download and/or render a given set of resources.

Notably, the indicators 130 may be implemented in a number of different ways. For example, the indicators 130 may be set explicitly by the developer. Alternatively, the indicators 130 may be set by default such that a developer must specifically cause an indicator not to be set. In a similar embodiment, indicators may only be provided for resources that should be monitored for downloading and/or rendering or may only be provided for resources that should not be downloaded and/or rendered.

FIG. 1 illustrates a performance script 132. The performance script can be generated at the server 102 and injected into the HTML code 108. The performance script 132 includes an indication of a set of resources required to be at least one of downloaded to or rendered at the client for the web page to be considered loaded at the client. In particular, the performance script 132 includes the list of resources that the developer has identified to be required to be downloaded/rendered The performance script 132 further includes instructions configured to determine when each individual resource in the required resources have been be at least one of downloaded to or rendered at the client. Further, the performance script 132 includes computer executable instructions to determine a length of time associated with at least one of downloading to or rendering at the client 104 the resources in the set of resources.

For example, in some embodiments, the performance script 132 may include a manifest of resources needed for the web page 112. The performance script may further include instructions to cause a timer at the web browser 116 to start. As each image, script, style sheet, etc. in the manifest of resources is downloaded and/or rendered, such action is noted.

Once all of the resources in the manifest have been downloaded the timer can be consulted to determine the amount of time to download and/or render all of the resources in the manifest. A report 134 can be created where the report includes at least an indication of time required to obtain and/or render resources for a web page 112 at the client 104. This report 134 can be sent to a reporting server 136, where statistics can be aggregated. Generation of the report may be done using instructions in the performance script 132.

Sending the report 134 to the reporting server 136 may also be facilitated by instructions included in the performance script 132. In one embodiment, sending the report may be accomplished by requesting a marker resource, such as an image, from the reporting server 136 where the request includes the details of the report 134.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Figure 2:
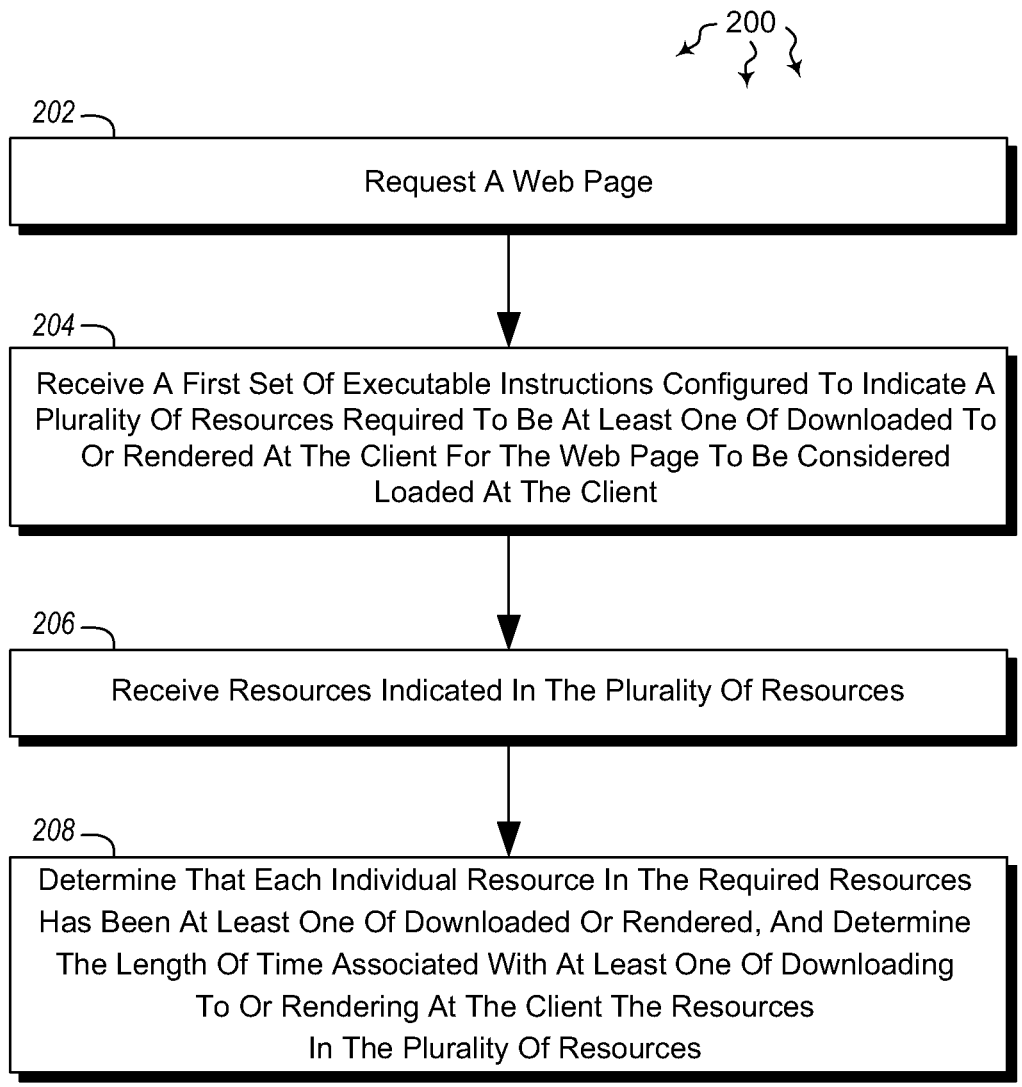
FIG. 2 illustrates a method of gathering performance information with respect to delivering web resources as perceived by a user at the web client.

Referring now to FIG. 2, a method 200 is illustrated. The method 200 includes acts that may be performed in computing environment including a web server and a web client. The method 200 includes acts for gathering performance information with respect to delivering web resources as perceived by a user at the web client. The method includes requesting a web page (act 202). For example, the client 104 illustrated in FIG. 1 may send a web page request 124 to the server 102.

As a result of the request, the method 200 may include receiving a first set of executable instructions (act 204). The first set of executable instructions include instructions configured to indicate a plurality of resources required to be at least one of downloaded to or rendered at the client for the web page to be considered loaded at the client. The first set of executable instructions also include instructions configured to determine when each individual resource in the required resources has been be at least one of downloaded to or rendered at the client. The first set of executable instructions also include instructions configured to determine a length of time associated with at least one of downloading to or rendering at the client the resources in the plurality of resources. Illustratively, the server 102 may generate a performance script 132 which includes a list of resources, such as those indicated using the references 110 and the indicators 130. In particular, the performance script 132 may include the list of resources that the developer has identified to be required to be downloaded/rendered. The performance script 132 may be generated as a result of receiving the web page request 124, or may have been previously generated due to caching based on a previous web request, pre-generation of the performance script 132, or otherwise generated. However, the performance script 132 is not read from the cache from a request to a different page. Rather, each page contains its own unique list of resources. Thus, the performance script 132 may be read from a cache generated by a request to the same page, but typically not from a cache generated by a request to a different page. The performance script 132 may be injected into an HTML document 108, which is then returned to the client 104.

The method 200 further includes receiving resources indicated in the plurality of resources (act 206). For example, using the references 110, the client 104 may send requests 126 for resources. The resources, such as image 114, client script 120, css style sheets, etc. can be returned to the client 104.

The method 200 further includes, using the executable instructions, determining that each individual resource in the required resources has been at least one of downloaded or rendered, and determining the length of time associated with at least one of downloading to or rendering at the client the resources in the plurality of resources (act 208). In particular, the executable instructions can be executed at the client 104 to determine that resources for the web page 112 have been downloaded and/or rendered and to determine the length of time to download and/or render the resources.

The method 200 may be practiced where determining the length of time associated with at least one of downloading to or rendering at the client the resources in the plurality of resources includes starting and stopping a timer included in a web browser at the client. In particular, the web browser 116 may include a timer application programming interface (api) that can be activated. The performance script 132 may include code to start a timer included in the web browser 116.

The method 200 may be practiced where determining the length of time associated with at least one of downloading to or rendering at the client the resources in the plurality of resources includes starting and stopping a timer included in a browser plug in for a web browser at the client. In particular, a browser plug in may be provided for use with the browser 116. Using a plug in may allow for more precise timing functionality, such as time for individual resources to download, or time for a particular subset of resources to download, etc.

The method 200 may be practiced where determining the length of time associated with at least one of downloading to or rendering at the client the resources in the plurality of resources includes determining a length of time for at least one of downloading to or rendering at the client the resources in the plurality of resources for each individual resource. Thus for example, a time can be determined for each image, each client side script, each style sheet, etc., independent from other resources.

The method 200 may be practiced where determining the length of time associated with at least one of downloading to or rendering at the client the resources in the plurality of resources includes determining a length of time associated with at least one of downloading to or rendering at the client all of the resources in the plurality of resources. Thus, for example, a time can be determined with respect to all resources in a manifest included in the performance script 132.

The method 200 may be practiced where determining the length of time associated with at least one of downloading to or rendering at the client the resources in the plurality of resources includes beginning measuring a length of time from about when the first set of executable instructions are executed. For example, when the HTML document 108 with the performance script 132 is received by the client 104, a portion of the performance script 132 may be executed. This first execution of the performance script 132 may start a process, such as starting a timer, to determine the length of time associated with at least one of downloading to or rendering at the client the resources in the plurality of resources.

In an alternative embodiment, the method 200 may be practiced where determining the length of time associated with at least one of downloading to or rendering at the client the resources in the plurality of resources includes beginning measuring a length of time from after when the first set of executable instructions are executed and when other resources begin to be downloaded or rendered. In this example, two metrics may be measured. The first is from about when the performance script 132 is first executed, and the second is from about when one or more resources (e.g. 114 and/or 120) are requested, or start to be received or rendered.

The method 200 may further include sending the length of time to a data recording and reporting server to be processed. For example, as illustrated, the report 134 can be sent to the reporting server 136. In one embodiment, sending the length of time to a data recording and reporting server to be processed may include requesting a marker resource from the data recording and reporting server, where the request for the marker resource comprises the length of time as part of the request. For example, embodiments may include requesting a marker image from the data recording and reporting server. The request may include elements of the report 134.

The method 200 may be practiced where determining that each individual resource in the required resources has been at least one of downloaded or rendered may include for an image resource determining that a state of the image resource is set to an indication provided by a browser that downloading of the image is complete. For example, the browser 116 may include the ability to specify state such as downloading or completed downloading. Thus, a determination can be made using the indication provided by the browser.

The method 200 may be practiced where determining that each individual resource in the required resources has been at least one of downloaded or rendered may include for a client side code resource executing instruction appended to the client side code resource that when executed causes an indication that the client side code resource has been at least one of downloaded or rendered. For example, as illustrated in FIG. 1, code 122 can be injected into client side script 120 that is returned to the client 104. When the injected code 122 is executed at the client 104, execution of the injected code 122 causes an indication to be made that a resource (i.e. client side script 120) had been rendered at the client 104. The indication can be made, for example in a manifest included in the performance script 132. The instruction appended to the client side code resource may be appended to the client side code resource by a server providing the client side code resource. Thus, in the example illustrated in FIG. 1, the injected code 122 is injected at the server 102 which provides the client side script 120.

Figure 3:
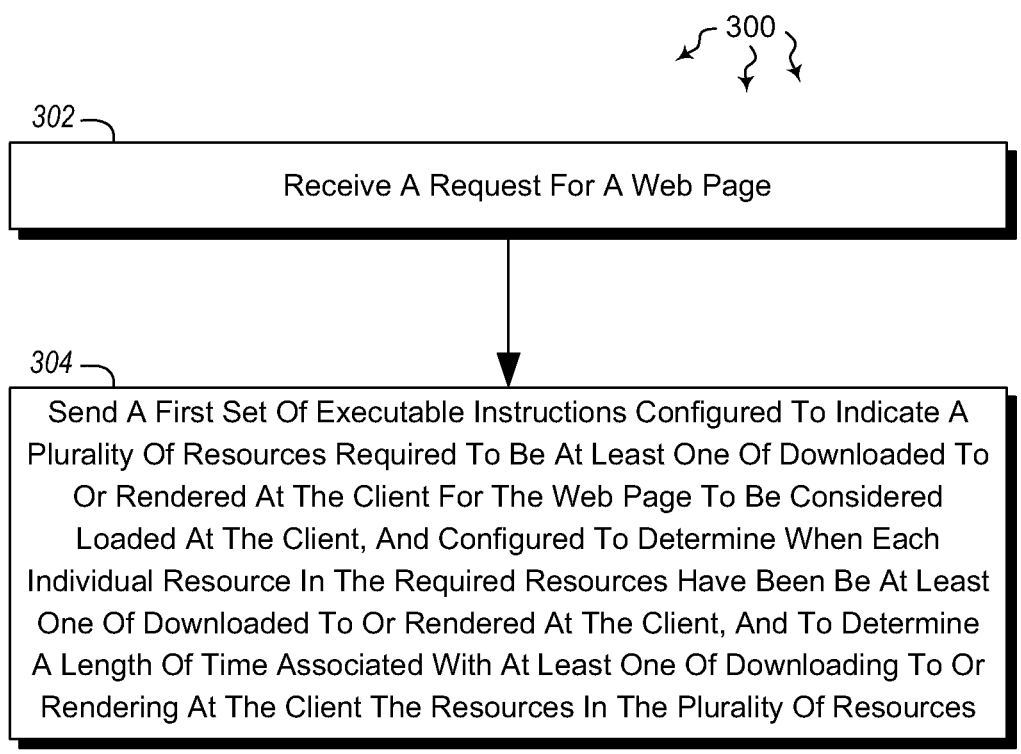
FIG. 3 illustrates another method of gathering performance information with respect to delivering web resources as perceived by a user at the web client.

Referring now to FIG. 3, another method 300 is illustrated. The method 300 may be practiced in computing environment including a web server and a web client. The method includes acts for gathering performance information with respect to delivering web resources as perceived by a user at the web client. The method includes at a server, receiving a request for a web page (act 302). For example, the web page request 124 may be received at the server 102.

The method 300 further includes as a result of receiving the request sending a first set of executable instructions (act 304). The first set of executable instructions are configured to indicate a plurality of resources required to be at least one of downloaded to or rendered at the client for the web page to be considered loaded at the client. The first set of executable instructions are further configured to determine when each individual resource in the required resources have been be at least one of downloaded to or rendered at the client. The first set of executable instructions are further to determine a length of time associated with at least one of downloading to or rendering at the client the resources in the plurality of resources. For example, FIG. 1 illustrates the performance script 132 being sent to the client 104.

The method 300 may be practiced where the first set of executable instructions are injected into an HTML document. The HTML document includes URI references to the resources in the plurality of resources. For example, FIG. 1 illustrates an HTML document 108 with resource references 110. The performance script 132 is injected into the HTML document 108.

The method 300 may further include for a client side code resource, appending instruction to the client side code resource, prior to sending the client side code resource to the client. When the appended instructions are executed, the execution causes an indication that the client side code resource has been at least one of downloaded or rendered. For example, as illustrated in FIG. 1, code 122 is injected into the client side script 120. The injected code 122 can be executed at the client 104, and when executed at the client, provides an indication that the client side script 120 has been downloaded and/or executed.

The method 300 may further include creating instructions configured to indicate a plurality of resources required to be at least one of downloaded to or rendered at the client for the web page to be considered loaded at the client in the first set of instruction including determining that a developer has marked one or more resources as required. For example, as illustrated in FIG. 1 the indicators 130 can be used by a developer to indicate which resources should be tracked. A list of those resources can then be included in the performance script 132. As noted previously, marking one or more resources as required may be by default. In particular, no specific action, in this embodiment, is required by the developer for the resources to be included in the set of tracked resources.

The method 300 may further include creating the first set of executable instructions as a result of and after receiving the request for the web page. However in some embodiments, the method 300 may further include caching the first set of executable instructions for subsequent requests for the web page. Thus, after the initial request 124, other requests from the client 104 or form other clients can be serviced by sending a cached version of the performance script 132.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. The preceding are also example of non-transitory storage media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In computing environment including a web server and a web client, a method of gathering performance information with respect to delivering web resources as perceived by a user at the web client the method comprising:
   at a client, requesting a web page;
   as a result of the request, receiving an HTML document, the HTML document comprising references to a plurality of web page resources used to render a web page;
   as a result of the request receiving a first set of executable instructions injected into the HTML document, the first set of executable instructions including a list of a plurality of resources, that is a subset of the web page resources, that are required to be at least one of downloaded to or rendered at the client for the web page to be considered loaded at the client, and configured to determine when each individual resource in the required resources have been be at least one of downloaded to or rendered at the client, and to determine a length of time associated with at least one of downloading to or rendering at the client the resources in the plurality of resources;
   receiving resources indicated in the plurality of resources; and
   using the executable instructions, determining that each individual resource in the required resources has been at least one of downloaded or rendered, and determining the length of time associated with at least one of downloading to or rendering at the client the resources in the plurality of resources.

2. The method of claim 1, wherein determining the length of time associated with at least one of downloading to or rendering at the client the resources in the plurality of resources comprises starting and stopping a timer included in a web browser at the client.

3. The method of claim 1, wherein determining the length of time associated with at least one of downloading to or rendering at the client the resources in the plurality of resources comprises starting and stopping a timer included in a browser plug in for a web browser at the client.

4. The method of claim 1, wherein determining the length of time associated with at least one of downloading to or rendering at the client the resources in the plurality of resources comprises determining a length of time for at least one of downloading to or rendering at the client the resources in the plurality of resources for each individual resource.

5. The method of claim 1, wherein determining the length of time associated with at least one of downloading to or rendering at the client the resources in the plurality of resources comprises determining a length of time associated with at least one of downloading to or rendering at the client all of the resources in the plurality of resources.

6. The method of claim 1, wherein determining the length of time associated with at least one of downloading to or rendering at the client the resources in the plurality of resources comprises beginning measuring a length of time from when the first set of executable instructions are executed.

7. The method of claim 1, wherein determining the length of time associated with at least one of downloading to or rendering at the client the resources in the plurality of resources comprises beginning measuring a length of time from after when the first set of executable instructions are executed and when other resources begin to be downloaded or rendered.

8. The method of claim 1, further comprising sending the length of time to a data recording and reporting server to be processed.

9. The method of claim 8, wherein sending the length of time to a data recording and reporting server to be processed comprises requesting a marker resource from the data recording and reporting server, wherein the request for the marker resource comprises the length of time as part of the request.

10. The method of claim 9, wherein requesting a marker resource from the data recording and reporting server comprises requesting a marker image from the data recording and reporting server.

11. The method of claim 1, wherein using the executable instructions, determining that each individual resource in the required resources has been at least one of downloaded or rendered comprises for an image resource determining that a state of the image resource is set to an indication provided by a browser that downloading of the image is complete.

12. The method of claim 1, wherein using the executable instructions, determining that each individual resource in the required resources has been at least one of downloaded or rendered comprises for a client side code resource executing additional code injected into the client side code resource where the injected code, when executed, causes an indication that the client side code resource has been at least one of downloaded or rendered.

13. The method of claim 12 wherein the additional code injected into the client side code resource has been injected into the client side code resource by a server providing the client side code resource.

14. In computing environment including a web server and a web client, a method of gathering performance information with respect to delivering web resources as perceived by a user at the web client the method comprising:
   at a server, receiving a request for a web page;
   as a result of receiving the request, sending an HTML document, the HTML document comprising references to a plurality of web page resources used to render a web page; and
   as a result of receiving the request sending a first set of executable instructions injected into the HTML document, the first set of executable instructions including a list of a plurality of resources, that is a subset of the web page resources, that are required to be at least one of downloaded to or rendered at the client for the web page to be considered loaded at the client, and configured to determine when each individual resource in the required resources have been be at least one of downloaded to or rendered at the client, and to determine a length of time associated with at least one of downloading to or rendering at the client the resources in the plurality of resources.

15. The method of claim 14, further comprising for a client side code resource appending instruction to the client side code resource, prior to sending the client side code resource to the client, that when executed causes an indication that the client side code resource has been at least one of downloaded or rendered.

16. The method of claim 14, further comprising creating instructions configured to indicate a plurality of resources required to be at least one of downloaded to or rendered at the client for the web page to be considered loaded at the client in the first set of instruction including determining that a developer has marked one or more resources as required.

17. The method of claim 14, further comprising caching the first set of executable instructions for subsequent requests for the web page.

18. One or more physical computer readable storage media comprising computer executable instructions that when executed by a processor are configured to perform the following:
   receive a request for a web page;
   as a result of receiving the request, sending an HTML document, the HTML document comprising references to a plurality of web page resources used to render a web page; and
   as a result of receiving the request send a first set of executable instructions injected into the HTML document, the first set of executable instructions including a list of a plurality of resources, that is a subset of the web page resources, that are required to be at least one of downloaded to or rendered at the client for the web page to be considered loaded at the client, and configured to determine when each individual resource in the required resources have been be at least one of downloaded to or rendered at the client, and to determine a length of time associated with at least one of downloading to or rendering at the client the resources in the plurality of resources.

* * * * *